United States Patent
Kinnune et al.

(10) Patent No.: US 9,470,394 B2
(45) Date of Patent: Oct. 18, 2016

(54) LED LIGHT FIXTURE INCLUDING OPTICAL MEMBER WITH IN-SITU-FORMED GASKET AND METHOD OF MANUFACTURE

(71) Applicant: Cree, Inc., Durham, NC (US)

(72) Inventors: Brian Kinnune, Racine, WI (US); Dave Goelz, Milwaukee, WI (US)

(73) Assignee: CREE, INC., Durham, NC (US)

( * ) Notice: Subject to any disclaimer, the term of this patent is extended or adjusted under 35 U.S.C. 154(b) by 0 days.

(21) Appl. No.: 14/551,656

(22) Filed: Nov. 24, 2014

(65) Prior Publication Data

US 2016/0146425 A1    May 26, 2016

(51) Int. Cl.
| | |
|---|---|
| *F21V 5/04* | (2006.01) |
| *F21V 29/70* | (2015.01) |
| *F21V 19/00* | (2006.01) |
| *F21K 99/00* | (2016.01) |
| *F21V 31/00* | (2006.01) |
| *B29D 11/00* | (2006.01) |
| *F21Y 101/02* | (2006.01) |

(Continued)

(52) U.S. Cl.
CPC ............. *F21V 5/04* (2013.01); *B29D 11/0073* (2013.01); *F21K 9/90* (2013.01); *F21V 19/001* (2013.01); *F21V 29/70* (2015.01); *F21V 31/005* (2013.01); *B29K 2101/12* (2013.01); *B29K 2105/253* (2013.01); *B29K 2995/0003* (2013.01); *B29K 2995/0036* (2013.01); *F21Y 2101/02* (2013.01)

(58) Field of Classification Search
CPC ... F21V 15/013; F21V 31/005; H01L 25/075
See application file for complete search history.

(56) References Cited

U.S. PATENT DOCUMENTS

| | | |
|---|---|---|
| 4,808,101 A | 2/1989 | Schad |
| 5,223,275 A | 6/1993 | Gellert |
| 5,485,317 A | 1/1996 | Perissinotto |

(Continued)

FOREIGN PATENT DOCUMENTS

| | | |
|---|---|---|
| DE | 202014100462 | 4/2014 |
| JP | H0319818 | 1/1991 |

(Continued)

OTHER PUBLICATIONS

"Focus on Precision—Injection Molding Optical Components" by Michael Stricker, et al., translated from Kunststoffe Apr. 2009, 5 pages.

(Continued)

*Primary Examiner* — Matthew Landau
*Assistant Examiner* — Grant Withers
(74) *Attorney, Agent, or Firm* — Jansson Munger McKinley & Kirby Ltd.

(57) ABSTRACT

An LED light fixture including a mounting surface which supports a circuit board with at least one LED light source spaced thereon, and an optical member which has a back side having a groove facing the mounting surface and surrounding the circuit board. The groove is filled with a resilient in-situ-formed compressible gasket material sealingly engaged with the mounting surface to environmentally seal the circuit board. The mounting surface may be of a heat-sink structure. The in-situ-formed gasket has an inner edge and a plurality of inward projections spaced therealong. Each inward projection extends inwardly to a position facing the circuit board and presses the circuit board against the mounting surface, thereby facilitating heat transfer away from the circuit board.

22 Claims, 11 Drawing Sheets

(51) Int. Cl.
*B29K 101/12* (2006.01)
*B29K 105/00* (2006.01)

(56) References Cited

U.S. PATENT DOCUMENTS

| | | | |
|---|---|---|---|
| 5,494,615 A | 2/1996 | Wang Lee | |
| 5,821,695 A * | 10/1998 | Vilanilam | F21V 25/12 315/58 |
| 5,904,414 A * | 5/1999 | Monteleone | F21L 4/005 362/202 |
| 5,954,423 A | 9/1999 | Logan | |
| 6,123,889 A | 9/2000 | Katagiri | |
| 6,395,201 B1 | 5/2002 | Hunt | |
| 6,461,010 B1 | 10/2002 | Knight | |
| 6,499,870 B1 | 12/2002 | Zwick | |
| 6,502,956 B1 | 1/2003 | Wu | |
| 6,606,199 B2 | 8/2003 | Wang | |
| 6,896,381 B2 | 5/2005 | Benitez et al. | |
| 7,056,567 B2 | 6/2006 | O'Neill | |
| 7,115,979 B2 * | 10/2006 | Park | H01L 33/483 257/676 |
| 7,259,032 B2 * | 8/2007 | Murata | H01L 24/97 257/684 |
| 7,283,313 B2 | 10/2007 | Tamaoki | |
| 7,607,799 B2 | 10/2009 | Ohkawa | |
| 7,637,630 B2 * | 12/2009 | Wilcox | F21V 5/04 362/158 |
| 7,682,533 B2 | 3/2010 | Iatan | |
| 7,696,527 B2 | 4/2010 | Uemoto | |
| 7,722,196 B2 | 5/2010 | Caire | |
| 7,724,321 B2 | 5/2010 | Hsieh | |
| 8,215,814 B2 | 7/2012 | Marcoux | |
| 8,235,547 B2 | 8/2012 | Hofmann | |
| 8,338,852 B2 * | 12/2012 | Hochstein | F21K 9/00 257/712 |
| D681,250 S | 4/2013 | Ruffalo | |
| 8,434,912 B2 | 5/2013 | Holder | |
| 8,891,171 B2 | 11/2014 | Choquet | |
| 8,899,786 B1 | 12/2014 | Moghal et al. | |
| 2002/0034081 A1 | 3/2002 | Serizawa | |
| 2002/0149312 A1 * | 10/2002 | Roberts | F21V 29/76 313/495 |
| 2002/0179921 A1 * | 12/2002 | Cohn | B81B 7/0051 257/99 |
| 2003/0066672 A1 * | 4/2003 | Watchko | C23C 4/00 174/50 |
| 2003/0169504 A1 | 9/2003 | Kaminsky | |
| 2003/0222249 A1 * | 12/2003 | Bunyan | H01L 23/3737 252/500 |
| 2003/0235050 A1 | 12/2003 | West | |
| 2004/0161490 A1 | 8/2004 | Babin | |
| 2004/0224110 A1 * | 11/2004 | Jimbo | H01L 21/67303 428/35.7 |
| 2004/0246606 A1 | 12/2004 | Benitez | |
| 2005/0073840 A1 | 4/2005 | Chou | |
| 2005/0168987 A1 | 8/2005 | Tamaoki | |
| 2005/0231812 A1 | 10/2005 | Leu | |
| 2006/0065989 A1 * | 3/2006 | Druffel | B29C 35/0805 264/1.32 |
| 2006/0164252 A1 * | 7/2006 | Richmond | F21V 21/0824 340/606 |
| 2006/0252169 A1 | 11/2006 | Ashida | |
| 2007/0164454 A1 * | 7/2007 | Andrews | H01L 33/62 257/783 |
| 2007/0171652 A1 * | 7/2007 | Gaines | F21V 7/005 362/346 |
| 2008/0002414 A1 * | 1/2008 | Miletich | F21S 8/02 362/382 |
| 2008/0043466 A1 | 2/2008 | Chakmakjian | |
| 2008/0079182 A1 | 4/2008 | Thompson | |
| 2008/0084693 A1 | 4/2008 | Shimada | |
| 2008/0198604 A1 | 8/2008 | Kim | |
| 2008/0203415 A1 | 8/2008 | Thompson | |
| 2008/0212319 A1 * | 9/2008 | Klipstein | B60Q 3/065 362/231 |
| 2008/0220549 A1 * | 9/2008 | Nall | H05K 3/284 438/26 |
| 2008/0232129 A1 * | 9/2008 | Lyons | B60Q 1/2611 362/547 |
| 2008/0237840 A1 | 10/2008 | Alcoe | |
| 2008/0272380 A1 * | 11/2008 | Wilcox | F21S 8/086 257/88 |
| 2008/0273325 A1 * | 11/2008 | Wilcox | F21V 5/007 362/240 |
| 2008/0273326 A1 * | 11/2008 | Wilcox | F21V 15/01 362/249.01 |
| 2008/0273327 A1 * | 11/2008 | Wilcox | F21S 2/005 362/267 |
| 2008/0278941 A1 * | 11/2008 | Logan | F21S 4/008 362/234 |
| 2008/0285136 A1 | 11/2008 | Jacobowitz | |
| 2008/0298056 A1 | 12/2008 | Petersen | |
| 2009/0159915 A1 | 6/2009 | Branchevsky | |
| 2009/0196034 A1 * | 8/2009 | Gherardini | F21K 9/00 362/235 |
| 2009/0242922 A1 * | 10/2009 | Lin | F21V 31/005 257/99 |
| 2009/0251898 A1 * | 10/2009 | Kinnune | F21V 29/83 362/249.02 |
| 2009/0298376 A1 * | 12/2009 | Guillien | F21V 5/04 445/43 |
| 2010/0002449 A1 | 1/2010 | Lin | |
| 2010/0089438 A1 * | 4/2010 | Reyal | H01L 31/048 136/251 |
| 2010/0163909 A1 | 7/2010 | Chen | |
| 2010/0207140 A1 | 8/2010 | Rudaz | |
| 2010/0271708 A1 | 10/2010 | Wilcox | |
| 2010/0271829 A1 | 10/2010 | LaPorte | |
| 2010/0328960 A1 * | 12/2010 | Wang | F21V 29/004 362/373 |
| 2011/0019402 A1 * | 1/2011 | Mo | F21S 8/04 362/235 |
| 2011/0043120 A1 | 2/2011 | Panagotacos | |
| 2011/0063857 A1 | 3/2011 | Li et al. | |
| 2011/0089838 A1 * | 4/2011 | Pickard | F21V 29/767 315/113 |
| 2011/0103051 A1 | 5/2011 | Wilcox | |
| 2011/0103059 A1 | 5/2011 | Chen | |
| 2011/0141722 A1 * | 6/2011 | Acampora | F21S 4/008 362/218 |
| 2011/0149548 A1 * | 6/2011 | Yang | F21V 5/04 362/84 |
| 2011/0157891 A1 | 6/2011 | Davis et al. | |
| 2011/0176301 A1 | 7/2011 | Liang | |
| 2011/0194292 A1 * | 8/2011 | Tsai | F21V 17/164 362/311.02 |
| 2011/0222284 A1 | 9/2011 | Kong | |
| 2011/0235313 A1 * | 9/2011 | Canella | F21L 4/00 362/157 |
| 2011/0242807 A1 | 10/2011 | Little | |
| 2011/0267822 A1 | 11/2011 | Harbers | |
| 2011/0280014 A1 | 11/2011 | Householder | |
| 2011/0292658 A1 | 12/2011 | Ho | |
| 2012/0003343 A1 | 1/2012 | Armstrong | |
| 2012/0014115 A1 | 1/2012 | Park et al. | |
| 2012/0048528 A1 * | 3/2012 | Bergin | H01L 23/3733 165/185 |
| 2012/0057351 A1 * | 3/2012 | Wilcox | F21V 19/0055 362/307 |
| 2012/0057352 A1 * | 3/2012 | Wilcox | F21K 9/54 362/308 |
| 2012/0091487 A1 | 4/2012 | Chan et al. | |
| 2012/0120659 A1 | 5/2012 | Lopez | |
| 2012/0126268 A1 | 5/2012 | Seo | |
| 2012/0170280 A1 | 7/2012 | Choquet | |
| 2012/0201031 A1 | 8/2012 | Marley | |
| 2012/0218773 A1 * | 8/2012 | Peiler | F21V 31/005 362/520 |
| 2012/0242245 A1 * | 9/2012 | Pachler | H01L 25/075 315/250 |
| 2012/0268936 A1 | 10/2012 | Pickard | |
| 2012/0281404 A1 | 11/2012 | Wilcox | |
| 2012/0287634 A1 | 11/2012 | Kochetkov | |
| 2012/0294011 A1 | 11/2012 | Cattoni | |

(56) References Cited

U.S. PATENT DOCUMENTS

| | | | |
|---|---|---|---|
| 2012/0300456 A1* | 11/2012 | Phillips, III | F21V 5/04 362/245 |
| 2012/0307495 A1 | 12/2012 | Shih | |
| 2012/0319592 A1 | 12/2012 | Risebosch | |
| 2012/0319616 A1 | 12/2012 | Quilici | |
| 2013/0044501 A1* | 2/2013 | Rudisill | F21V 29/004 362/398 |
| 2013/0063934 A1* | 3/2013 | Vermeland | F21V 31/005 362/217.05 |
| 2013/0148363 A1 | 6/2013 | Choquet | |
| 2013/0170235 A1* | 7/2013 | Armstrong | F21V 29/20 362/373 |
| 2013/0182419 A1* | 7/2013 | Worman | F21V 15/01 362/183 |
| 2013/0240925 A1* | 9/2013 | Lai | H01L 33/648 257/98 |
| 2013/0248905 A1* | 9/2013 | Lee | H01L 33/52 257/98 |
| 2014/0029114 A1 | 1/2014 | Kim | |
| 2014/0061684 A1* | 3/2014 | Marutani | H01L 33/62 257/88 |
| 2014/0126206 A1 | 5/2014 | Wilcox | |
| 2014/0166352 A1* | 6/2014 | Ueda | H01L 23/10 174/258 |
| 2014/0177226 A1 | 6/2014 | Goelz | |
| 2014/0192529 A1* | 7/2014 | Wilcox | F21V 3/00 362/244 |
| 2014/0204533 A1* | 7/2014 | Abeyasekera | H01L 23/3735 361/699 |
| 2014/0268761 A1 | 9/2014 | Raleigh | |
| 2014/0268810 A1 | 9/2014 | Marquardt | |
| 2014/0268825 A1* | 9/2014 | Lay | F21V 21/03 362/371 |
| 2014/0302624 A1* | 10/2014 | Kim | H01L 21/56 438/26 |
| 2014/0355297 A1* | 12/2014 | Castillo | F21S 8/03 362/582 |
| 2014/0355302 A1* | 12/2014 | Wilcox | G02B 6/0073 362/609 |
| 2014/0367718 A1* | 12/2014 | Park | H01L 33/486 257/98 |
| 2015/0021628 A1* | 1/2015 | Medendorp, Jr. | H01L 33/0095 257/88 |
| 2015/0109820 A1* | 4/2015 | Wilcox | F21K 9/52 362/609 |
| 2015/0124449 A1* | 5/2015 | Wilcox | F21K 9/50 362/244 |
| 2015/0129910 A1* | 5/2015 | Sekowski | H05K 1/00 257/91 |
| 2015/0153033 A1* | 6/2015 | Kuo | F21V 29/24 362/311.02 |
| 2015/0159852 A1* | 6/2015 | Dahlen | F21V 29/503 362/249.02 |
| 2015/0160396 A1* | 6/2015 | Wilcox | G02B 6/0006 362/555 |
| 2015/0198760 A1* | 7/2015 | Wilcox | G02B 6/0038 362/606 |
| 2015/0241050 A1* | 8/2015 | Wilcox | F21V 29/763 362/249.02 |
| 2015/0253488 A1* | 9/2015 | Wilcox | G02B 6/0038 362/612 |
| 2015/0260377 A1* | 9/2015 | Hobson | F21V 17/164 362/362 |

FOREIGN PATENT DOCUMENTS

| | | |
|---|---|---|
| JP | H03138147 | 6/1991 |
| JP | H03142207 | 6/1991 |
| WO | 2008/076399 | 6/2008 |
| WO | 2010/095068 | 8/2010 |
| WO | 2011/091529 | 8/2011 |
| WO | 2013/152286 | 10/2013 |

OTHER PUBLICATIONS

English language abstract of DE202014100462, Grunecker et al., Apr. 10, 2014.
English language abstract of JPH03138147, Akihiro et al.
English language abstract of JPH03142207, Hiroshi et al.
English language abstract of JPH0319818, Tatsu.

* cited by examiner

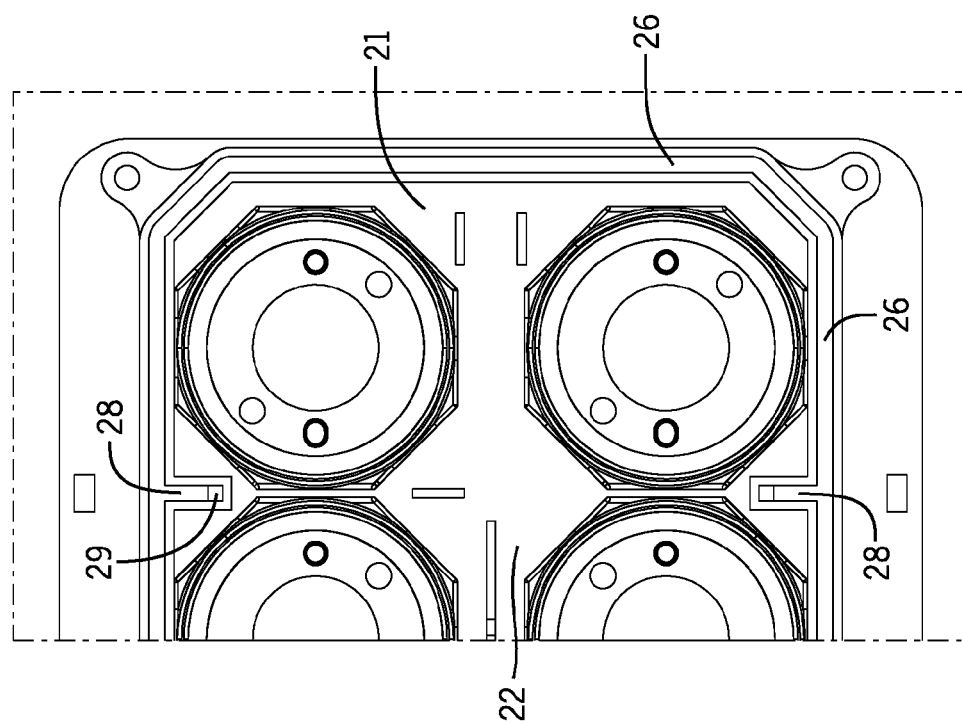
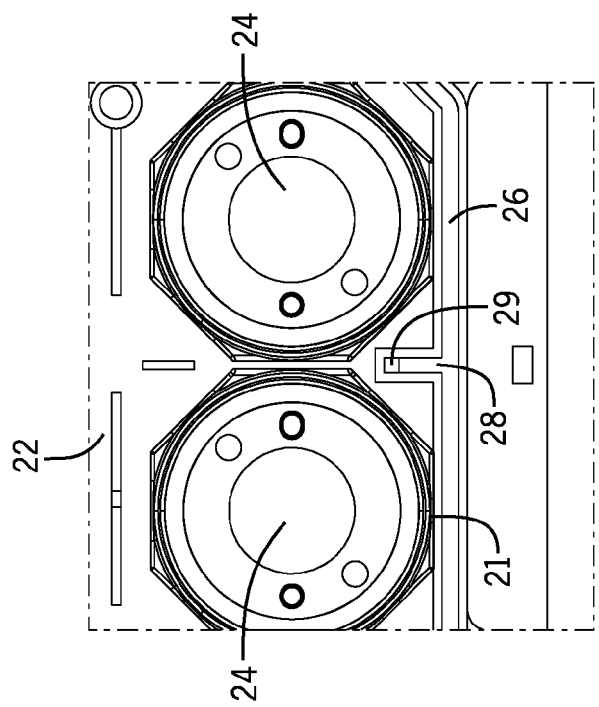
FIG. 2B
FIG. 2A

LED LIGHT FIXTURE INCLUDING OPTICAL MEMBER WITH IN-SITU-FORMED GASKET AND METHOD OF MANUFACTURE

FIELD OF THE INVENTION

The invention relates generally to the field of LED (light emitting diode) light fixtures and, more particularly, to optical members for LED light fixtures and method of manufacture.

BACKGROUND OF THE INVENTION

There is a need for lighting apparatus for a variety of general lighting purposes which is low-cost and energy-efficient. LED light sources are energy-efficient, and advances in LED technology are providing even greater efficiencies over time. One important aspect of LED light fixtures is the so-called secondary lensing that directs light received from LED light sources. As used herein, the term "LED light source" refers to an LED alone or a small grouping of LEDs, or to what is referred to as an LED package—namely, an LED (or small grouping of LEDs) with what is referred to as a primary lens thereon. Secondary lenses, which receive and direct light from LED light sources, are of significant importance to LED light fixtures in many ways.

Secondary lenses play a major role, of course, in the direction of light from a light fixture, and so determine the degree and spread of illumination, and overall optical efficiency. The forming and shaping of secondary lenses are typically important considerations with respect to the usefulness of an LED fixture, and play a significant role in overall product cost. Improvements in secondary lensing members, their optical capabilities, and their manufacture are important considerations in the field of LED light fixtures.

LED light fixtures for a wide variety of both specific and general lighting applications typically have a plurality of LED light sources, usually positioned in spaced relationship to one another on a board (e.g., a circuit board), and a secondary lens is aligned with each LED light source. Improvements in such light fixtures, including thermal performance, weather sealing of LED light sources and manufacturing efficiency are important considerations in the field of LED light fixtures. More specifically, speed (and therefore cost) and accuracy of manufacture are particularly important considerations.

It would be beneficial to provide optical members, and LED light fixtures which are low in cost and have superior dissipation of heat produced by LEDs during operation and which contribute to the overall economy, longevity and efficiency of LED light fixtures.

SUMMARY OF THE INVENTION

One aspect of the present invention relates to improved LED light fixtures. In certain embodiments, the LED light fixture includes a mounting surface which supports at least one LED light source thereon, and an optical member which has a back side facing the mounting surface and having a secondary lens corresponding to each of the at least one light source. The back side of the optical member has a groove surrounding the LED light source(s). The groove is filled with a resilient in-situ-formed compressible gasket material sealingly engaged with the mounting surface to environmentally seal the LED light source(s).

The light fixture may include a circuit board with the at least one LED light source thereon. In such embodiments, the circuit board is supported by the mounting surface.

Certain embodiments may have a plurality of LED light sources supported by the mounting surface. Such LED light sources may be on the circuit board supported by the mounting surface. In some of such embodiments, the optical member has a plurality of secondary lenses each for alignment with a corresponding one of the light sources.

In some versions of light fixtures, the LED light source(s) or LED arrays may be disposed directly on the mounting surface. LED light sources in such arrangements are sometimes referred to as chip-on-board LEDs. In fixtures utilizing a plurality of emitters, a plurality of LEDs or LED arrays may be disposed directly on a common submount with the LEDs or LED arrays being in spaced relationship with the other LEDs or LED arrays. In some other embodiments, each of the LEDs or LED arrays on a submount and each of the submounts may be mounted on the circuit board. In some of such embodiments, each of the LEDs or LED arrays may be overmolded with a respective primary lens, the secondary lens(es) of the optical member of the present invention corresponding to each of such primary lens(es).

In some embodiments, the LED light fixture has a heat-sink structure which includes the mounting surface. In certain embodiments, the in-situ-formed gasket has an inner edge and a plurality of inward projections spaced therealong. In some of such embodiments, each inward projection extends inwardly to a position facing the circuit board and presses the circuit board against the mounting surface, thereby facilitating heat transfer away from the circuit board.

The inward projections may be configured for enhanced pressing of the circuit board against the mounting surface of the heat-sink structure.

The circuit board has a front surface. In some embodiments, each of the inward projections faces the circuit-board front surface and has an enlarged mass which is spaced from the inner edge of the gasket and extends away from the optical-member back surface. For each inward projection, the groove may have a spur-groove containing the in-situ-formed inward projection.

In certain embodiments, the in-situ-formed gasket material is a thermoplastic elastomer (TPE).

Another aspect of the present invention relates to a method for manufacturing an optical member for an LED light fixture of the type including a mounting surface supporting a circuit board with a plurality of LED light sources spaced thereon. In certain embodiments, the method includes the step of providing an optical-member carrier piece which has a back side for facing the circuit board. The optical carrier has a groove positioned to surround the circuit board. The method also includes the step of forming a resilient compressible gasket by injecting a TPE into the groove.

In some embodiments, the method further includes the step of forming a plurality of inward projections of the TPE integral with the gasket and spaced along an inner edge of the gasket. The inward projections extend inwardly to be positioned facing the circuit board.

In certain embodiments, for each inward projection, the groove has a spur-groove containing the in-situ-formed inward projection. Each spur-groove terminates with a distal end which is spaced from the inner edge of the gasket. Injection gates may be at the distal ends of the spur-grooves.

The meaning of the term "one-piece" includes optical members which have the carrier and lenses all integrally formed from the same material.

The meaning of the term "one-piece" also includes optical members which have portions of the carrier overmolded onto the lenses. One example of such multi-lens optical member and a method for manufacturing is described in co-owned patent application Ser. No. 13/843,649, filed on Mar. 15, 2013, the contents of which are incorporated herein in their entirety.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 2A is an enlarged view of a fragment of FIG. 2.

FIG. 2B is an enlarged view of another fragment of FIG. 2.

DETAILED DESCRIPTION OF EXEMPLARY EMBODIMENTS

FIGS. 1-3, 9 and 10 illustrate examples of optical members 20 for improved LED light fixtures 10 according to the present invention. One example of light fixture 10A is shown in FIGS. 4-8. An alternative example of light fixture 10B is shown in FIGS. 11-14.

Figure 6:
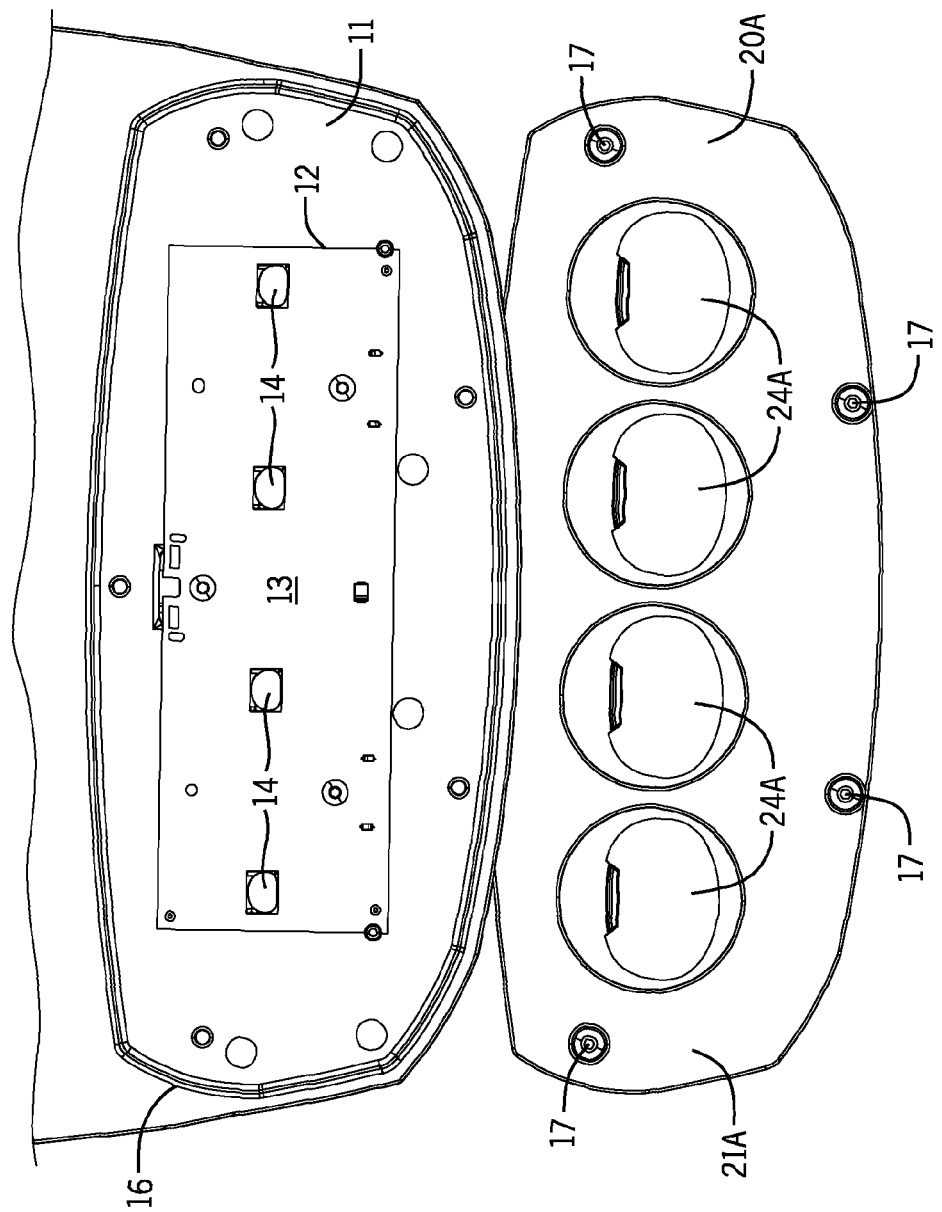
FIG. 6 is an exploded fragmentary view of the light fixture substantially as shown in FIG. 4.
Figure 7:
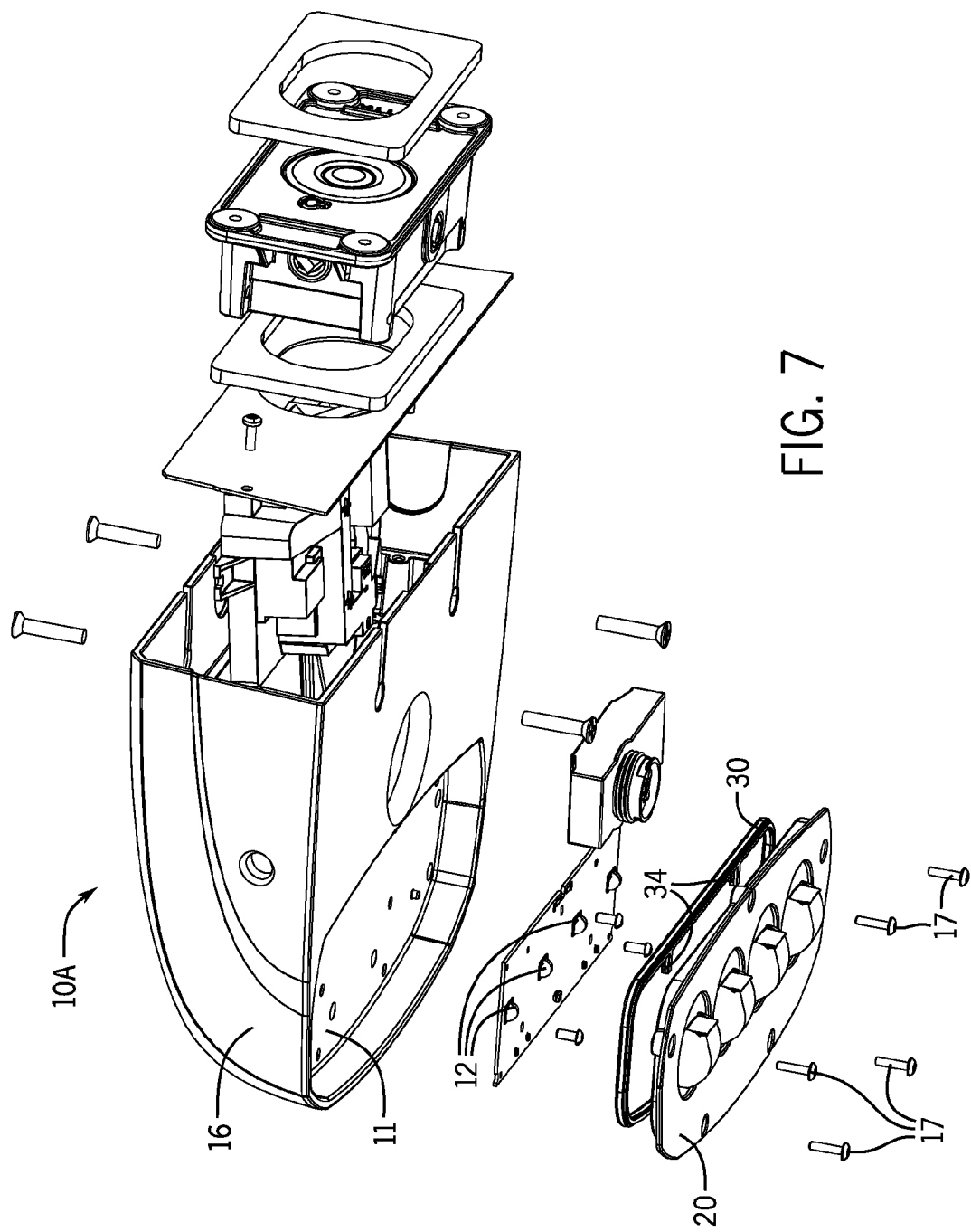
FIG. 7 is an exploded perspective view of the light fixture substantially as shown in FIG. 4, shown with the optical member removed to illustrate a circuit board on a mounting surface and schematically showing configuration of the in-situ-formed gasket if it were removed from the groove.
Figure 8:
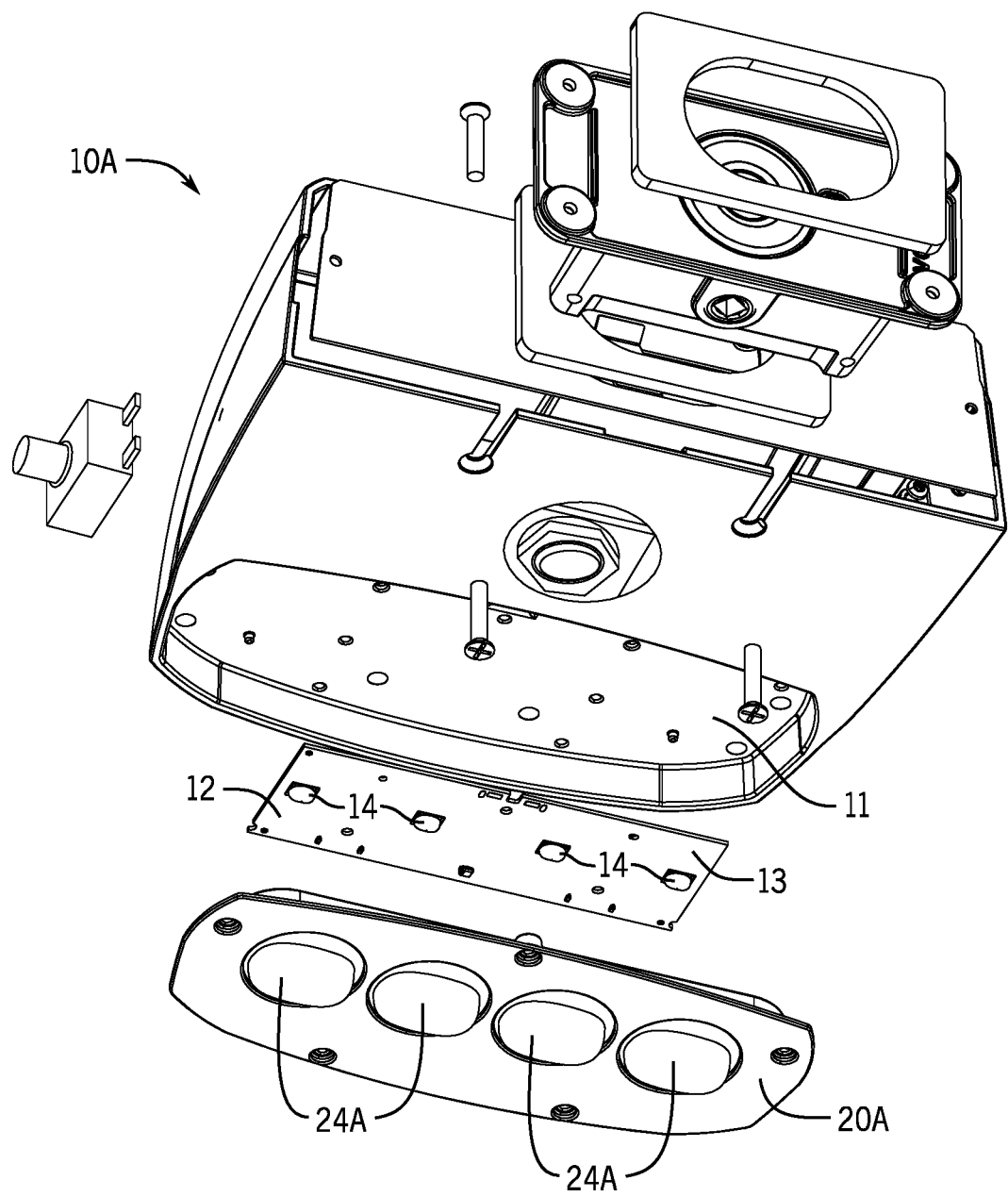
FIG. 8 is another exploded perspective view as shown in FIG. 6, but without removal of the in-situ-formed gasket from the groove.
Figure 10:
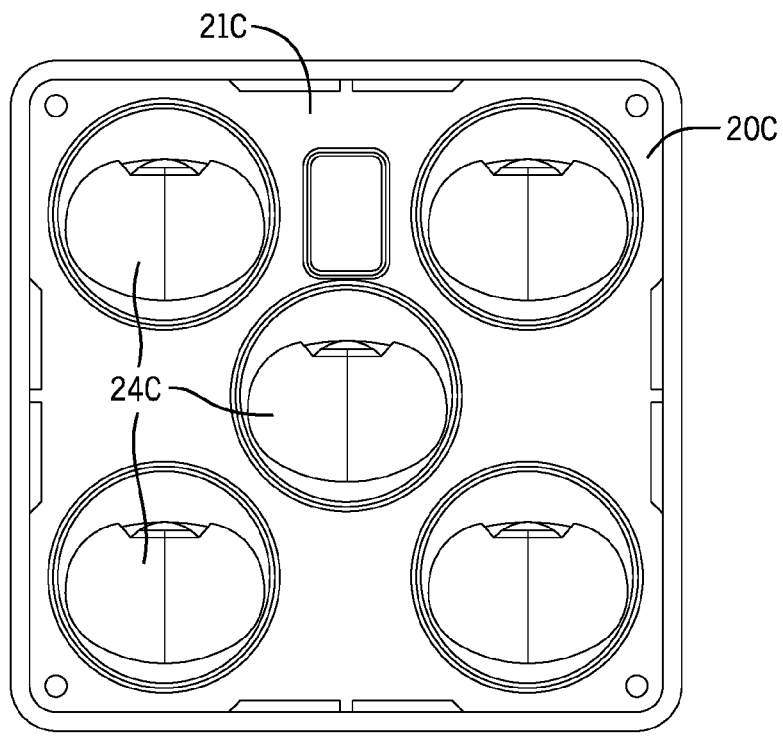
FIG. 10 is a perspective view from a light-output side of the optical member of FIG. 9.
Figure 9:
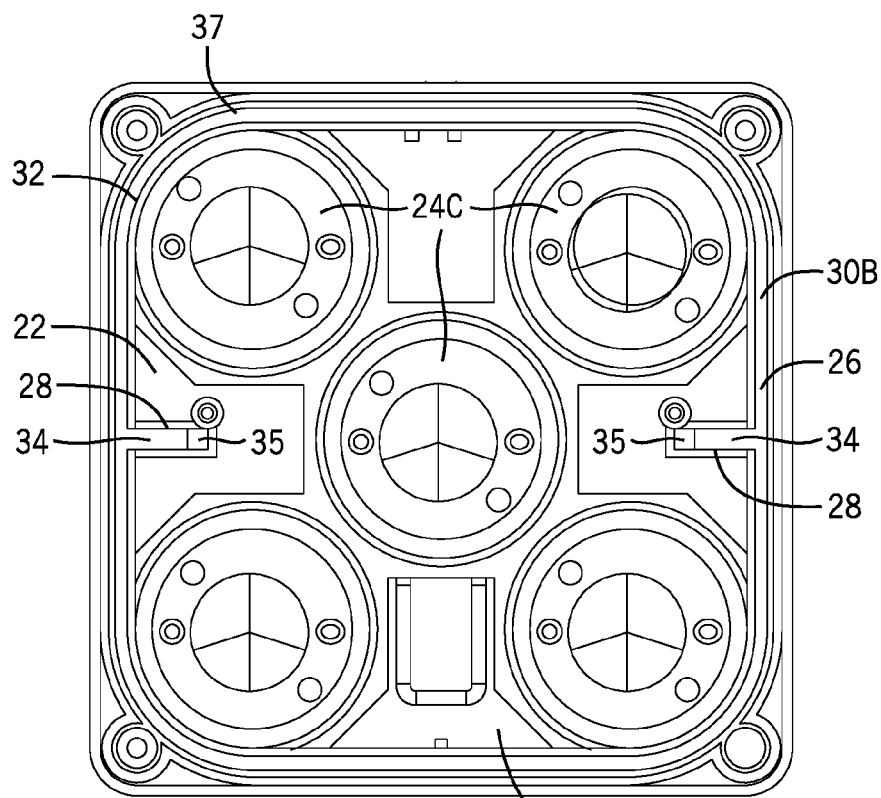
FIG. 9 is a perspective view from a back side of yet another example of an optical member with an in-situ-formed gasket in accordance with this invention.
Figure 11:
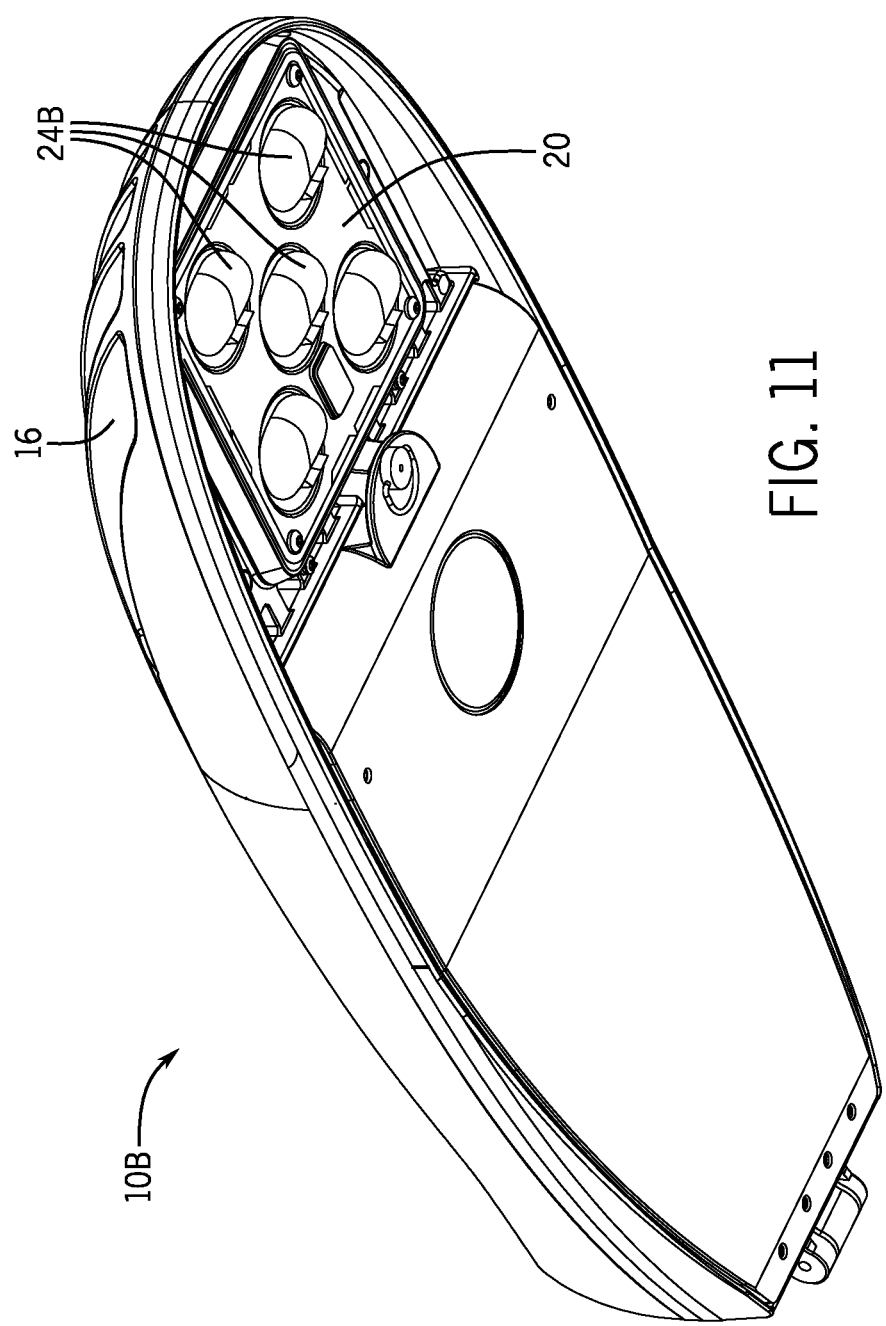
FIG. 11 is a perspective view of another example of a light fixture according to this invention.
Figure 12:
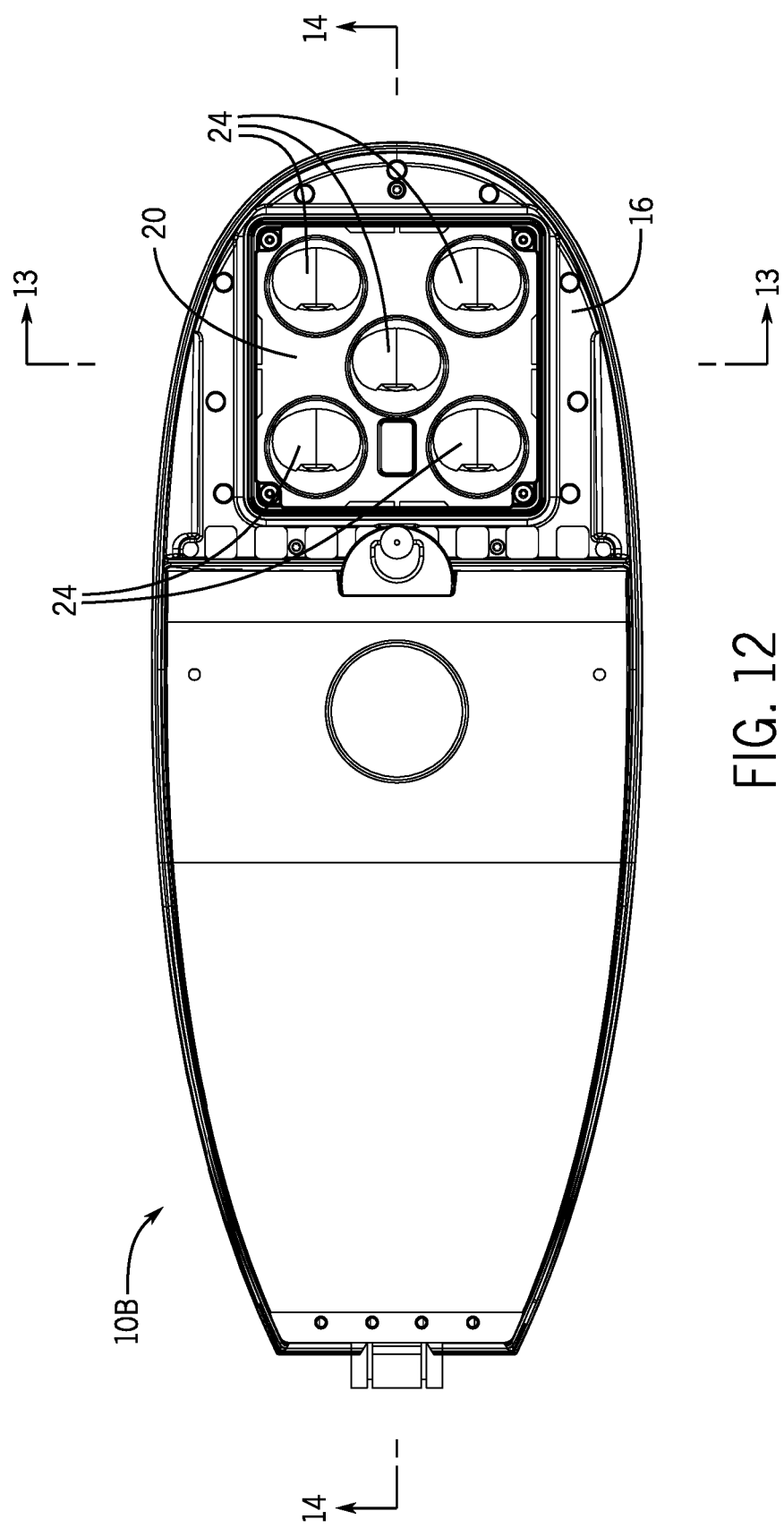
FIG. 12 is a plan view of the light fixture of FIG. 11.

FIGS. 6-8 best show LED light fixture 10 including a mounting surface 11 which supports a circuit board 12. Circuit board 12 has a front surface 13 with a plurality of LED light sources 14 spaced thereon. FIGS. 4-8 and 11-14 show mounting surface 11 being of a heat-sink structure 16. Light fixture 10 includes optical member 20 which has a back side 22 facing circuit board 12, as seen in FIGS. 7, 8, 13 and 14. Optical member 20 has an optical-member carrier piece 21 with a plurality of secondary lenses 24 each for alignment with a corresponding one of the light sources 14.

Figure 13:
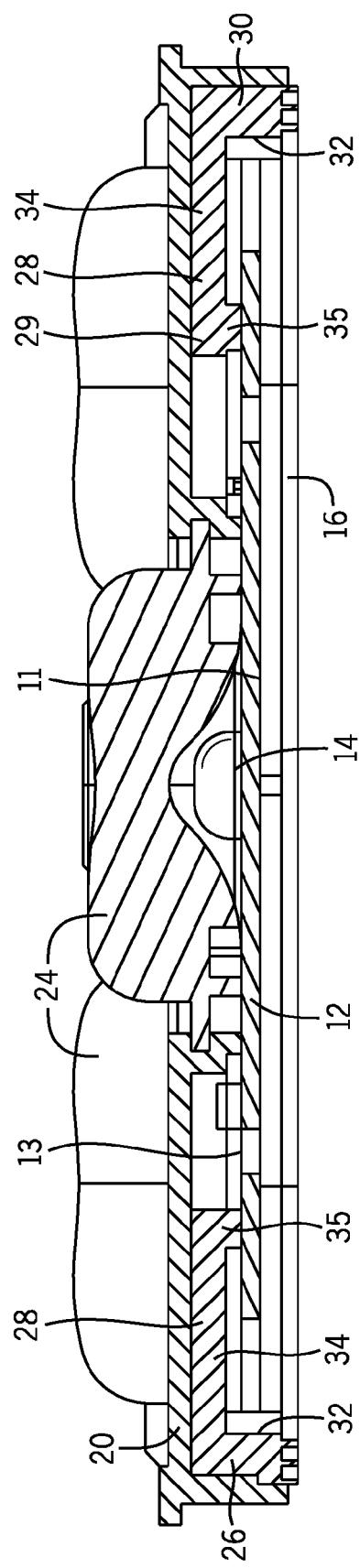
FIG. 13 is a fragmentary cross-sectional view of the light fixture of FIG. 11 taken along plane 13-13 shown on FIG. 12.
Figure 14:
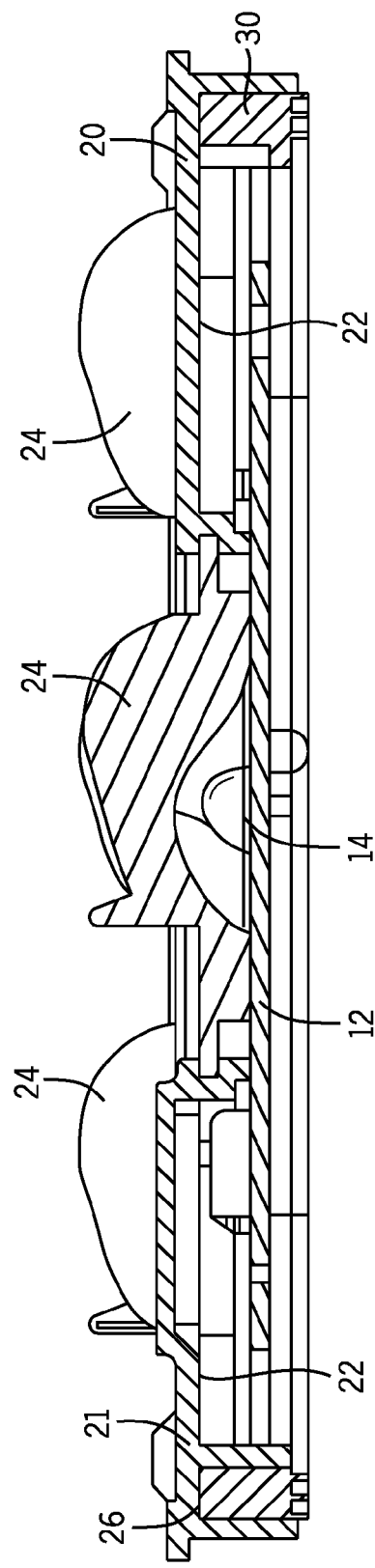
FIG. 14 is a fragmentary cross-sectional view of the light fixture of FIG. 11 taken along plane 14-14 shown on FIG. 12.

It is best seen in FIGS. 1, 2, 9, 13 and 14 that back side 22 of optical member 20 has a groove 26 filled with a resilient in-situ-formed compressible gasket 30. FIGS. 13 and 14 show gasket 30 sealingly engaged with mounting surface 11 to environmentally seal circuit board 12.

FIGS. 1, 2, 9 and 13 show in-situ-formed gasket 30 having an inner edge 32 and a plurality of inward projections 34 spaced therealong. FIG. 13 best shows inward projections 34 extending inwardly to positions facing circuit board 12 and pressing circuit board 12 against mounting surface 11, thereby facilitating heat transfer from circuit board 12 to heat-sink structure 16 through mounting surface 11.

Figure 1:
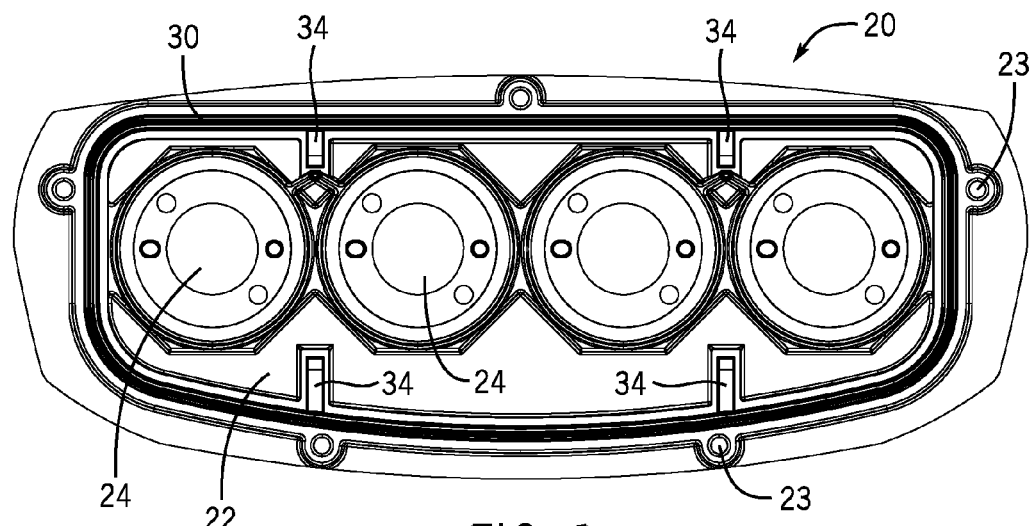
FIG. 1 is a perspective view from a back side of one example of an optical member, showing an in-situ-formed gasket in accordance with this invention.
Figure 1A:
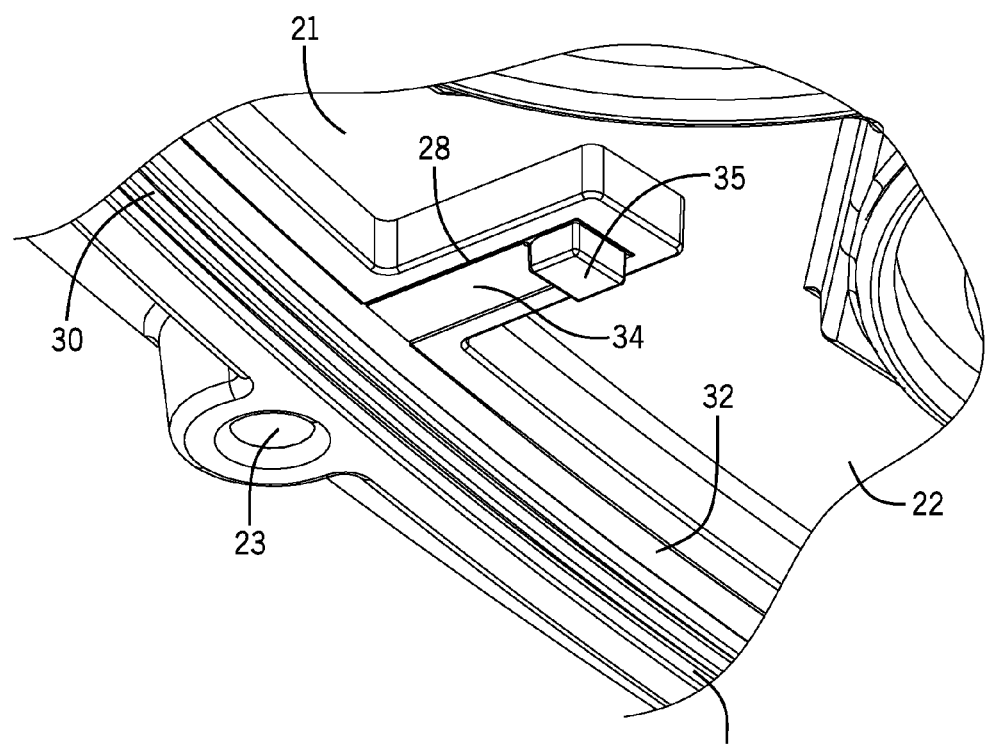
FIG. 1A is an enlarged view of a fragment of FIG. 1.
Figure 3:
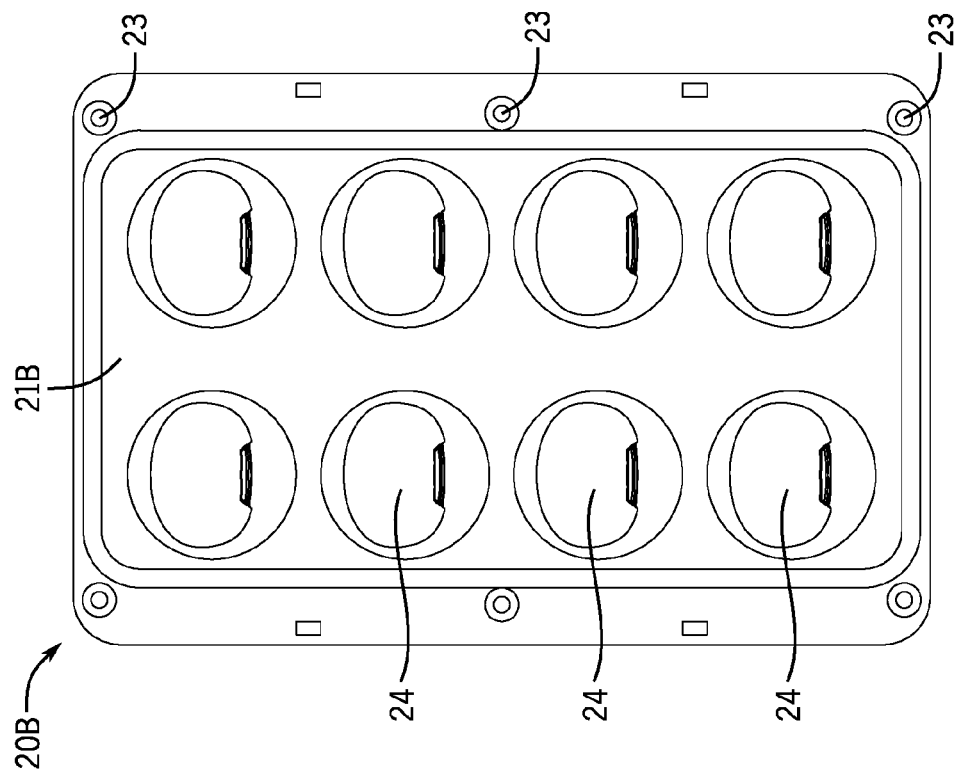
FIG. 3 is a perspective view from a light-output side of the optical member of FIG. 2.
Figure 2:
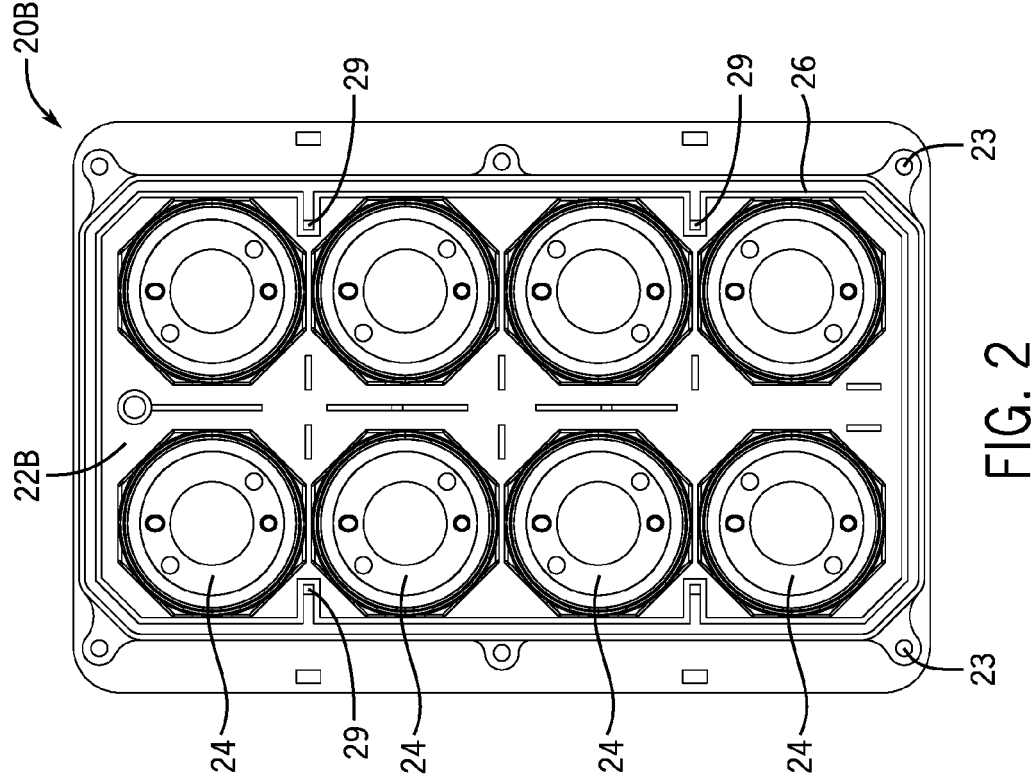
FIG. 2 is a perspective view from a back side of another example of an optical member, shown without an in-situ-formed gasket.
Figure 4:
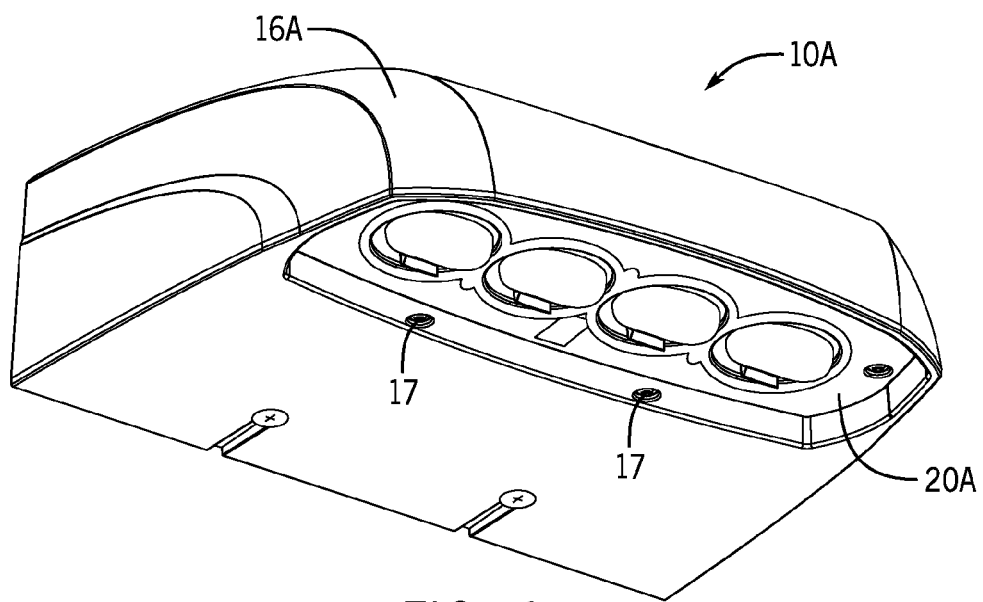
FIG. 4 is a perspective view of one example of a light fixture according to this invention.
Figure 5:
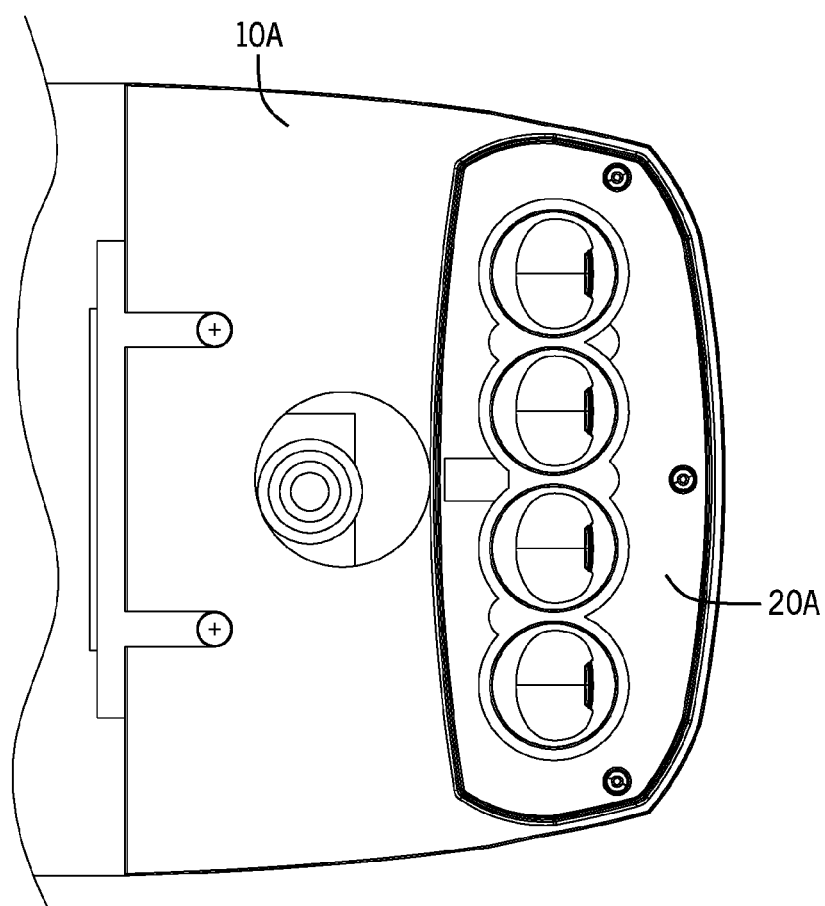
FIG. 5 is a fragmentary plan view of a light fixture substantially as shown in FIG. 4.

FIGS. 1 and 1A show inward projections 34 configured for enhanced pressing of circuit board 12 against mounting surface 11 of heat-sink structure 16. Each of inward projections 34 has an enlarged mass 35 which is spaced from inner edge 32 of gasket 30 and extends away from optical-member back surface 22. FIGS. 2, 2A and 2B show that for each inward projection 34, groove 26 has a spur-groove 28 containing in-situ-formed inward projection 34.

FIGS. 4-8 show optical member 20 being secured to fixture 10 with fasteners 17 which extend through holes 23 defined by carrier 21 and pull carrier 21 toward mounting surface 11. FIGS. 13 and 14 best show that, in assembled fixture 10, gasket 30 is sandwiched between carrier 21 and mounting surface 11. Such sandwiching forces enlarged masses 35 toward circuit board 12 and presses circuit board 12 against heat-sink structure 16, thereby facilitating thermal transfer from circuit board 12 to heat-sink structure 16 through mounting surface 11.

In certain embodiments, the in-situ-formed gasket material is a thermoplastic elastomer (TPE). One example of the TPE is silicone elastomer. However, other TPEs suitable for injection molding may also be used.

The particular TPE chosen will depend, among other things, on the material used in forming the carrier piece. Other considerations in choosing particular TPEs will depend, among other things, upon expected product operating temperatures, desired durability and desired elasticity. Examples of suitable TPE classes and TPEs include: polyolefin blends such as Elastocon STK40, available from Elastocon TPE Techologies, Inc., and Versaflex, available from Great Lakes Synergy Corporation; styrenic block copolymers; elastomeric alloys; thermoplastic polyurethanes; thermoplastic copolyesters; and thermoplastic polyamides.

Another aspect of the present invention relates to a method for manufacturing optical member 20 for LED light fixture 10. The method includes the step of providing an optical-member carrier piece 21 which has back side 22 for facing circuit board 12. FIGS. 2, 2A and 2B show optical carrier 21 having groove 26 positioned to surround circuit board 12. The method includes the step of forming resilient compressible gasket 30 by injection molding a TPE 37 into groove 26 seen in FIGS. 2, 2A and 2B, thereby overmolding the TPE onto the groove-defining structure of the carrier piece.

The step of forming gasket 30 includes the step of forming a plurality of inward projections 34 of TPE 37 integral with gasket 30 and spaced along inner edge 32 of gasket 30. As best seen in FIG. 13, inward projections 34 extend inwardly to be positioned facing circuit board 12. It is seen in FIGS. 1 and 2 that, for each inward projection 34, groove 26 has spur-groove 28 containing in-situ-formed inward projection 34.

Each spur-groove 28 terminates with distal end 29 which is spaced from inner edge 32 of gasket 30. Injection gates may be at distal ends 29 of spur-grooves 28.

The step of forming inward projections 34 includes the step of forming an enlarged mass 35 at each of the injection gates. It is best seen in FIGS. 1A and 13 that formed mass 35 extends away from optical-member back side 22.

The inventive configuration of the in-situ-formed gasket provides an advantageous triple function, including: (1) enhancing thermal contact between the circuit board and the mounting surface by each enlarged mass pressuring the circuit board toward the mounting surface, (2) facilitating absorption of shock at the optical member, and (3) environmentally sealing the LED light sources.

In addition to these functional advantages, the in-situ-formed gasket also provides manufacturing benefits by reducing the number of separate parts that require assembly, thereby lowering overall fixture cost.

While the principles of this invention have been described in connection with specific embodiments, it should be understood clearly that these descriptions are made only by way of example and are not intended to limit the scope of the invention.

The invention claimed is:

1. An LED light fixture comprising:
a mounting surface supporting a plurality of LED light sources; and
an optical member having a back side facing the mounting surface and having a groove with an inward edge surrounding the LED light sources and a plurality of spur-grooves, the groove and the spur-grooves being filled with a resilient compressible gasket sealingly engaged with the mounting surface, thereby environmentally sealing the LED light sources.

2. The LED light fixture of claim 1 further comprising:
a heat-sink structure including the mounting surface; and
a circuit board with the plurality of LED light sources thereon and supported by the mounting surface.

3. The LED light fixture of claim 2 wherein each spur-groove connects the groove to an injection gate spaced from an inward edge of the groove such that the gasket has an inner edge and a plurality of inward projections spaced therealong, each inward projection extending inwardly to a position facing the circuit board and pressing the circuit board against the mounting surface, thereby facilitating heat transfer away from the circuit board.

4. The LED light fixture of claim 3 wherein the inward projections are configured for enhanced pressing of the circuit board against the mounting surface of the heat-sink structure.

5. The LED light fixture of claim 4 wherein:
the circuit board has a front surface;
each of the inward projections faces the circuit-board front surface and has an enlarged mass which is spaced from the inner edge of the gasket and extends away from the optical-member back surface.

6. The LED light fixture of claim 3 wherein the inward projections are configured for enhanced pressing of the circuit board against the heat-sink structure.

7. The LED light fixture of claim 6 wherein:
the circuit board has a front surface;
each of the inward projections faces the circuit-board front surface and has an enlarged mass which is spaced from the inner edge of the gasket and extends away from the optical-member back side.

8. The LED light fixture of claim 1 wherein each spur-groove connects the groove to an injection gate spaced from an inward edge of the groove such that the gasket has an inner edge and a plurality of inward projections spaced therealong.

9. The LED light fixture of claim 1 wherein the gasket material is a thermoplastic elastomer (TPE).

10. A method for manufacturing an optical member for an LED light fixture of the type including a mounting surface supporting at least one LED light source and the optical member, the method comprising the steps of:
providing an optical-member carrier piece with a back side for facing the mounting surface, the back side having a groove positioned to surround the at least one LED light source, the groove including a plurality of spur-grooves extending inwardly from an inner edge of the groove; and
forming a resilient compressible gasket with a plurality of inward projections therealong by injecting a thermoplastic elastomer (TPE) into the groove and the spur-grooves.

11. The method of claim 10 wherein the light fixture further includes a circuit board with the at least one LED light source thereon and supported by the mounting surface.

12. The method of claim 11 wherein the inward projections extend inwardly to be positioned facing the circuit board.

13. The method of claim 11 wherein:
each spur-groove terminates with a distal end which is spaced from an inner edge of the gasket; and
injection gates are at the distal ends of the spur-grooves.

14. A method for manufacturing an optical member for at least one LED light source supported with respect to a mounting surface, the method comprising:
providing a groove and a plurality of spur-grooves formed in an optical-member back side positionable to face the mounting surface, the groove being configured to surround the at least one LED light source and the spur-grooves which extend inwardly from the groove to terminate with a distal end which is spaced from an inner edge of the groove; and
injecting a thermoplastic elastomer (TPE) into the groove through injection gates which are at the distal ends of the spur-grooves.

15. The method of claim 14 further including a step of forming an enlarged mass at each of the injection gates, the formed mass extending away from the optical-member back side.

16. An LED light fixture comprising:
a mounting surface supporting at least one LED light source; and
an optical member having a back side facing the mounting surface and having a lens corresponding to the at least one light source, the back side having a groove surrounding the at least one LED light source and at least one spur-groove extending inwardly from an inner edge of the groove, the groove and the at least one spur-groove being filled with a resilient compressible gasket.

17. The LED light fixture of claim 16 further comprising:
a heat-sink structure including the mounting surface; and
a circuit board with the at least one LED light source thereon and supported by the mounting surface.

18. The LED light fixture of claim 17 wherein the gasket has an inner edge and a plurality of inward projections spaced therealong, each inward projection extending inwardly to a position facing the circuit board and pressing the circuit board against the mounting surface, thereby facilitating heat transfer away from the circuit board.

19. The LED light fixture of claim 18 wherein the inward projections are configured for enhanced pressing of the circuit board against the mounting surface of the heat-sink structure.

20. The LED light fixture of claim 19 wherein:
the circuit board has a front surface;
the at least one inward projection faces the circuit-board front surface and has an enlarged mass which is spaced from the inner edge of the gasket and extends away from the optical-member back surface.

21. The LED light fixture of claim 16 wherein each spur-groove connects the groove to an injection gate spaced from an inward edge of the groove.

22. The LED light fixture of claim 16 wherein the gasket material is a thermoplastic elastomer (TPE).

* * * * *